UNITED STATES PATENT OFFICE.

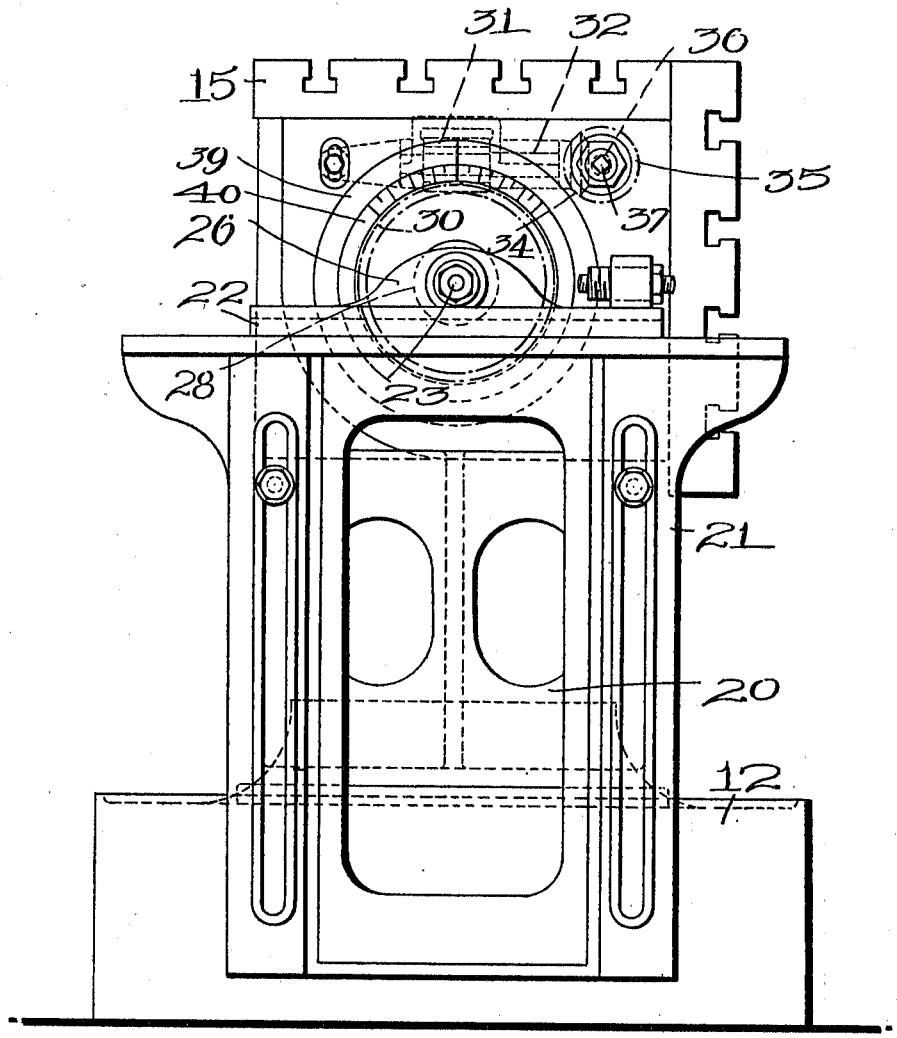

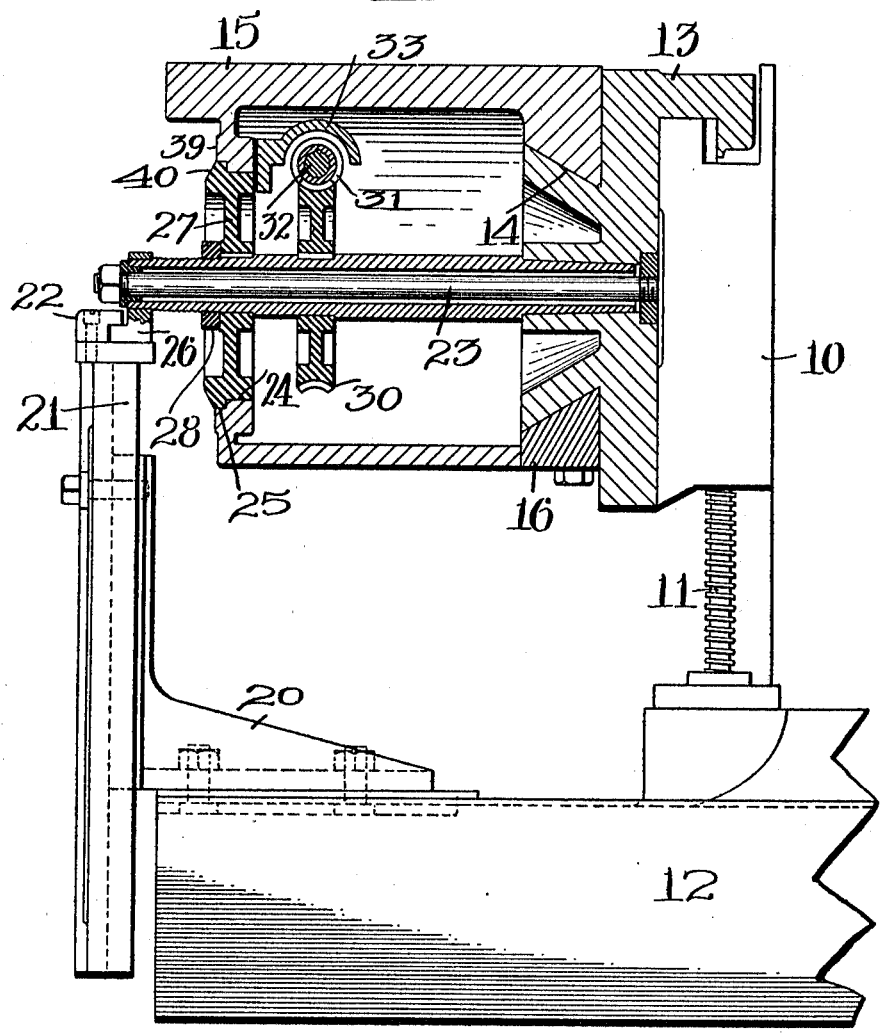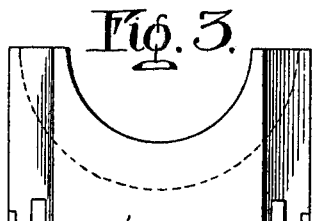

RADFORD STOCKBRIDGE, OF WORCESTER, MASSACHUSETTS, ASSIGNOR OF ONE-HALF TO ARTHUR W. BEAMAN, OF WORCESTER, MASSACHUSETTS.

SHAPING-MACHINE.

1,096,808. Specification of Letters Patent. Patented May 12, 1914.

Application filed December 13, 1912. Serial No. 736,491.

*To all whom it may concern:*

Be it known that I, RADFORD STOCKBRIDGE, a citizen of the United States, residing at Worcester, in the county of Worcester and State of Massachusetts, have invented a new and useful Shaping-Machine, of which the following is a specification.

This invention relates to a shaping machine and the principal objects thereof are to provide an extended rotatable knee or work support with means for rigidly supporting it at its outer end; to provide a suitable bearing carried by said outer support and a practical and convenient bearing for the inner end of the work support; to provide simple and effective means connected with the outer bearing for swinging the work support about a horizontal axis; and to provide other improvements in features of construction as will appear hereinafter.

Reference is to be had to the accompanying drawings in which,

Figure 1 is an end elevation of a shaper constructed in accordance with this invention; Fig. 2 is a central vertical sectional view thereof, and Fig. 3 is an elevation of a detail.

The invention is shown as applied to a shaping machine of any desired character, the details thereof not being shown, but it is provided with a bar 10 adjustable vertically by means of a screw 11 as is well understood in this art. These parts are supported on the frame 12. On the bar is a saddle 13 which is movable along the bar in any usual manner. On this saddle is a projecting conical bearing 14, larger at the outer than at the inner end, on which is mounted the knee or work support 15. This of course has a surface to fit the conical bearing surface 14. For the purpose of permitting these parts to be assembled and securing them when assembled a chip 16 is removably secured in position, by means of screws or the like, as will be obvious.

From the frame of the machine extends a bracket 20 having an outer support 21 adjustably mounted thereon, held in adjusted position by screws or the like. This adjustment is intended to follow the adjustment by the screw 11. At the top this outer support is provided with a clip 22 designed to engage a dog 26 on the end of a stationary shaft 23. This shaft extends centrally through the work support or knee 15 and is secured at the inner end in the saddle concentrically with the bearing 14. The dog is fixed to it by a nut or any other desired fastening means.

On the shaft is keyed a circular bearing member 27 which is held in position by a nut 28 and is shown as provided with two cylindrical surfaces 24 and 25, one larger than the other, and both of a large diameter so as to provide a firm and solid bearing for the end of the work support. A worm wheel 30 is non-rotatably mounted upon the fixed shaft 23 within the work support and meshes with a worm 31 on a transverse shaft 32 supported in bearings in the work support is covered by a shield 33. On this shaft 32 is a beveled gear 34 meshing with a beveled gear 35 on a shaft 36. This shaft 36 has a bearing in, and projects through, the end of the work support and has a non-circular end 37 so that it can be turned by a wrench from the outside.

The parts are easily assembled, as will be obvious, and in operation the shaft 36 is rotated by means of a wrench to turn the work support 15 on the axis of the shaft 23.

For the purpose of gaging the adjustment of the work support the end thereof at 39 and the end 40 on the bearing member 27 are provided respectively with a scale and line to show the angle through which the work support is turned about the horizontal shaft 23.

The construction is simple and inexpensive and provides a strong and rigid support for the heavy work support and the work thereon. There are no delicate parts likely to get out of order or adjustment and all danger of chattering from insufficient support of the work is avoided. The work support or knee also is just as rigidly supported in its inclined positions as in its horizontal one.

Although I have illustrated and described a single embodiment of the invention, I am aware of the fact that the same can be carried out in many other forms without departing from the scope of the invention as expressed in the claims. Therefore, I do not wish to be limited to all the details of construction herein shown and described, but What I do claim is:—

1. In a shaping machine, in combination, a frame, a work support having one end rotatably mounted on said frame, an outer support, a shaft supported at its two ends by said frame and said outer support respectively, and a bearing member mounted on said shaft intermediate its ends and constituting a bearing for the outer end of said work support.

2. In a shaping machine in combination, a frame having a horizontal bar secured thereto, a saddle mounted on said bar, a work support having one end thereof rotatably mounted on said saddle, an outer support mounted on the frame beyond the end of the work support, a non-rotatable horizontal shaft rigidly supported at its two ends by the saddle and the outer support respectively, and a supporting member mounted on said shaft intermediate its ends and constituting a bearing for rotatably supporting the outer end of the work support.

3. In a shaping machine, the combination with a bar, of a saddle longitudinally movable therein, a rotatable knee or work support mounted on said saddle at one end, an outer support at the end of said work support, a fixed horizontal shaft supported at its outer end by said outer support and extending centrally through the work support, means on said shaft near the outer support for rotatably supporting the outer end of the work support, a shaft extending through the end of said work support, and means connected with the first named shaft for rotating the work support when the second shaft is turned on its axis.

4. In a shaping machine, the combination, of a rotatable knee or work support, a fixed shaft extending centrally through the work support, means on said shaft near the outer support for rotatably supporting the outer end of the work support, a worm wheel fixed on said shaft, a worm meshing therewith and journaled in the work support for rotating the worm on its axis and thereby turning the work support on the axis of the shaft.

5. In a shaping machine, the combination with a saddle having a conical bearing thereon, of a work support or knee having a surface at one end fitting said bearing and having a removable chip for securing it with respect to said bearing.

6. In a shaping machine, the combination with a rotatable work support, of means on the shaper for holding and supporting one end of the work support, an outer support beyond the work support, a shaft fixed to the outer support and extending through the work support, and a bearing member keyed to the shaft and having two cylindrical surfaces one larger than the other, said work support having surfaces fitting said cylindrical surfaces, and a conical bearing surface at the inner end of the work support.

In testimony whereof I have hereunto set my hand, in the presence of two subscribing witnesses.

RADFORD STOCKBRIDGE.

Witnesses:
ALBERT E. FAY,
C. FORREST WESSON.

---

Copies of this patent may be obtained for five cents each, by addressing the "Commissioner of Patents, Washington, D. C."